United States Patent [19]
Tsukada et al.

[11] Patent Number: 5,018,878
[45] Date of Patent: May 28, 1991

[54] LINEAR GUIDE APPARATUS USING ROLLER TYPE LINEAR BEARING

[75] Inventors: Toru Tsukada, Maebashi; Hitoshi Yamada, Takasaki, both of Japan

[73] Assignee: Nippon Seiko Kabushiki Kaisha, Tokyo, Japan

[21] Appl. No.: 561,904

[22] Filed: Aug. 2, 1990

[30] Foreign Application Priority Data

Aug. 4, 1989 [JP] Japan ............... 1-92064[U]

[51] Int. Cl.⁵ ............................................. F16C 29/06
[52] U.S. Cl. .............................................. 384/44
[58] Field of Search ........................ 384/44, 43, 45; 464/168

[56] References Cited
U.S. PATENT DOCUMENTS

| | | |
|---|---|---|
| 3,353,874 | 11/1967 | DelVecchio et al. |
| 4,561,703 | 12/1985 | Dabringhaus ............ 384/44 |
| 4,659,238 | 4/1987 | Teramachi ............... 384/44 |
| 4,662,762 | 5/1987 | Schwarz .................. 384/44 |
| 4,902,143 | 2/1990 | Morita .................... 384/44 |

FOREIGN PATENT DOCUMENTS 59-195224 12/1984 Japan.

Primary Examiner—Lenard A. Footland
Attorney, Agent, or Firm—Basile and Hanlon

[57] ABSTRACT

A guide rail has a main track surface on an upper surface and sub-track surfaces on both side surfaces. The guide rail is further formed with axially extending grooves in both of the side surfaces respectively below the sub-track surfaces. A slider having a substantially U-shaped cross section has roller type linear bearings which roll respectively on the main track surface and the sub-tract surfaces. The slider is provided with protruding portions at lower surfaces of both side walls of the slider which extend horizontally and inwardly into the grooves of the guide rail. The protruding portions are slidably in contact with inner surfaces of the grooves and prevent the slider from slipping out of the guide rail. Furthermore, seal members made from rubber are attached respectively to lower surfaces of the protruding portions so that inner edges of the seal member are slidably in contact with the inner surfaces of the groove.

3 Claims, 4 Drawing Sheets

LINEAR GUIDE APPARATUS USING ROLLER TYPE LINEAR BEARING

BACKGROUND OF THE INVENTION

1. Field of the Invention

The present invention relates to an improvement in a roller type translation guide apparatus having roller type translation bearings.

2. Description of the Prior Art

A prior art linear guide apparatus using roller type linear bearing is disclosed, for example, in Japanese Utility Model Application Laid-Open No. 59-195224. In this apparatus, as shown in FIG. 8, an axially extending guide rail 1 has track surfaces formed by three outer surfaces including an upper surface 1a and two side surfaces 1b among the four outer surfaces. A slider 2 having an inverted U-shaped cross section is straddlingly mounted on the guide rail 1 and is movable in an axial direction along the track surfaces. The slider 2 has recessed portions respectively formed in three inner surfaces facing the guide rail 1. A roller type translation bearing 4 having roller trains 3 which roll on the track surface 1a or 1b of the guide rail 1 is mounted in each of the recessed portions.

However, in the prior art, since the slider is merely straddlingly mounted on the guide rail through the roller type translation bearings, the following problems have been encountered:

(1) The slider tends to be drawn out of the guide rail. In particular, when a force to lift the slider is applied to a machine to which the slider is attached, or at the time of removing the machine to a different facility, there is a danger that the slider can be separated from the guide rail.

(2) In an attitude in which the guide rail is mounted vertically, the apparatus cannot be used and its use or application is limited.

(3) Since the slider is in contact with the guide rail only through the roller trains, the effect of damping vibrations transmitted from the machine cannot substantially be expected.

SUMMARY OF THE INVENTION

The present invention was made in view of the problems mentioned above, and it is an object to provide a linear guide apparatus using roller type linear bearings which is provided with a slip-out preventing function and a vibration damping function by combining a roller guide and a slip guide, and by mechanically engaging a slider with a guide rail.

In order to achieve the object, in the present invention, a linear guide apparatus using roller type linear bearings comprises an axially extending guide rail having axial track surfaces on outer surfaces thereof, a slider straddlingly mounted on the guide rail and movable in an axial direction along the track surfaces, and roller type linear bearings attached to inner surfaces of the slider facing the outer surfaces of the guide rail, the roller type linear bearings having roller trains respectively rolling on the track surfaces of the guide rail.

The guide rail has on an upper surface thereof, a main track surface for one of the roller type linear bearings which receives a main load of the slider. The guide rail also has on both lateral side surfaces thereof respectively sub-track surfaces for two of the roller type linear bearings which receive lateral loads of the slider. Finally, the guide rail has grooves respectively formed in the lateral side surface thereof extending axially along the sub-tracks. The slider includes the roller type translation bearings having infinitely circulating roller trains respectively attached to positions respectively opposing the main and sub-track surfaces of the slider. The slider further includes protruding portions formed at positions respectively opposing the sub-tracks of the guide rail. The protruding portions respectively have sliding surfaces which slide on the grooves in the side surfaces of the guide rail and seal members mounted thereon.

One of the roller type linear bearings attached to the position which opposes one of the sub-surfaces of the guide rail may be provided with a preloading means for preloading the rollers against the track surface.

The preloading means may be provided with a preload adjusting bolt for adjusting the amount of the preload.

In the present invention, the protruding portions of the slider which mechanically engage the grooves in the side surfaces of the guide rail serve as slip-out preventing members. As a result, the slider never slips out of the guide rail and safety is insured. Besides, the apparatus can be used in a vertical condition.

Furthermore, the sliding surfaces of the preloading portions damp the vibrations caused by rolling of the rollers. Thus, noise levels are low.

Moreover, when the preloading means for preloading the rollers against the sliding surface is provided, and when the rollers of the roller type translation bearing are suitably preloaded in advance, variations in the attitude of the slider will be effectively prevented, and a higher accuracy will be obtained.

DESCRIPTION OF THE PREFERRED EMBODIMENTS

The embodiments of the present invention will be described with reference to the drawings.

Figure 1:
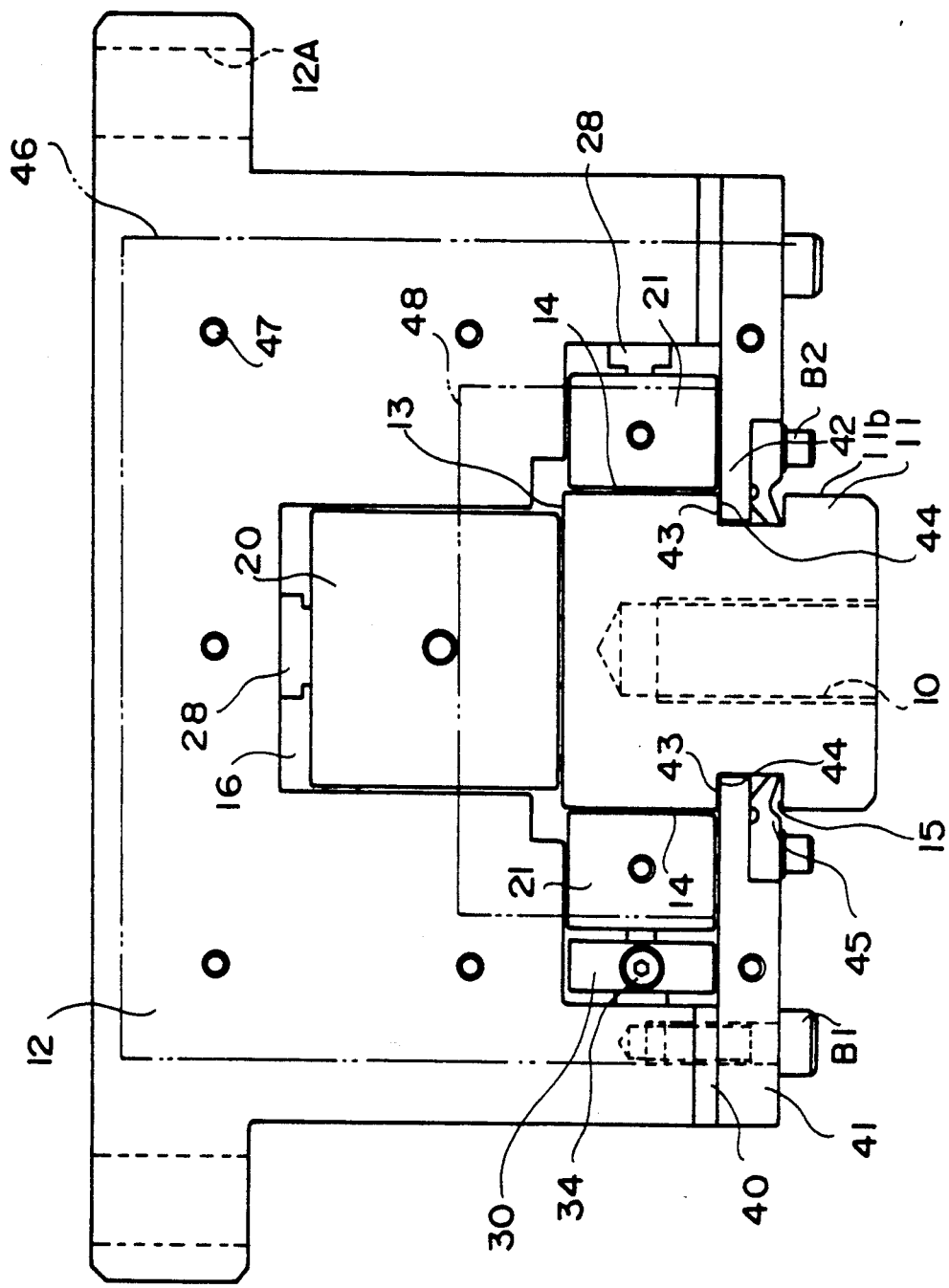
FIG. 1 is a front elevational view of a first embodiment of the invention in which an end plate is removed.

FIG. 1 shows a front elevational view of a main part of an embodiment of the invention.

A guide rail 11 has a square cross section and extends in an axial direction. A slider 12 having a substantially inverted U-shaped cross section is straddlingly mounted on the guide rail 11. An upper surface of the guide rail 11 forms a main track surface 13 for receiving a main load which is applied to the main track surface 13 downwardly from above.

On the other hand, sub-track surfaces 14 are formed on both lateral side surfaces of the guide rail 11 to receive lateral loads. Further, axially extending grooves 15 are respectively formed in both the lateral side surfaces of the guide rail 11 at intermediate positions between the upper surface and a bottom surface. In the illustrated embodiment, the grooves 15 are square grooves.

In an inner side of the slider 12 facing the guide rail 11, there is formed with a recess 16. A roller type translation bearing 20 having roller trains which roll on the main track surface 13 and a pair of roller type translation bearings 21 having roller trains which roll on the pair of sub-track surfaces 14 are attached to the inner surfaces of the recess 16.

Figure 2:
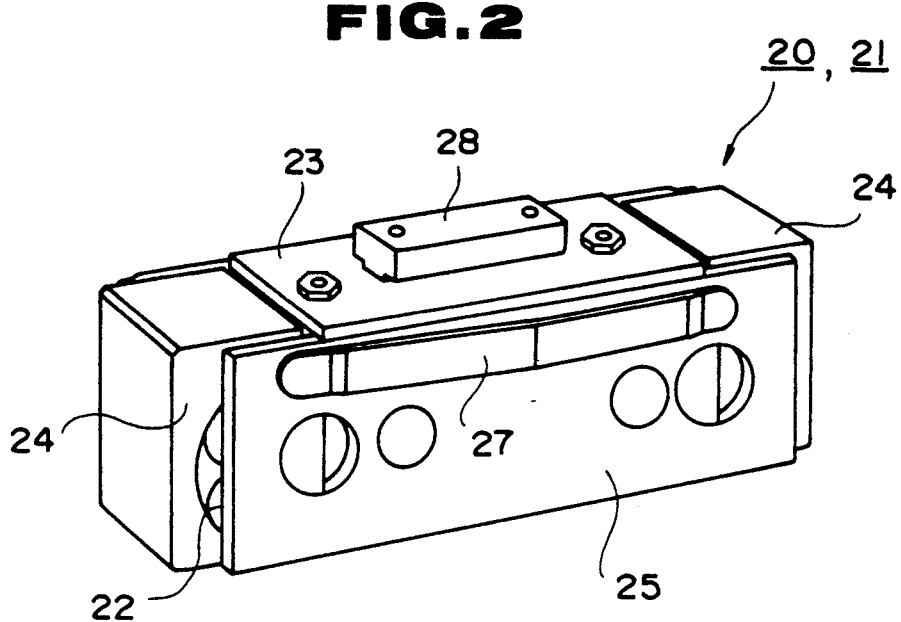
FIG. 2 is a perspective view of the roller type translation bearing shown in FIG. 1.
Figure 3:
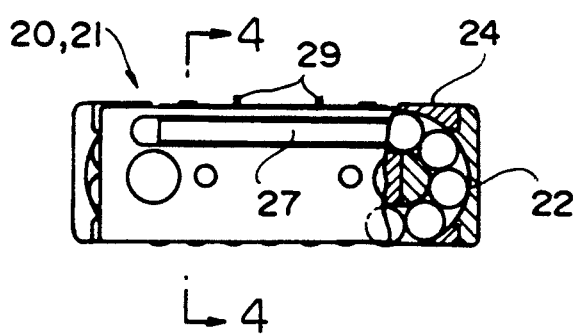
FIG. 3 is a side elevational view partially in cross section of the roller type translation bearing of FIG. 2.
Figure 4:
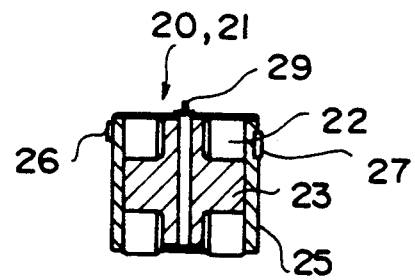
FIG. 4 is a cross-sectional view generally taken along the line 4—4 in FIG. 3.

The details of the roller type translation bearings 20 and 21 are shown in FIGS. 2 to 4. Each of the roller type linear bearings 20 and 21 includes two trains of rollers 22 which roll on the main track surface 13 or the sub-track surface 14, a main body 23 for supporting a load through the rollers 22, a pair of end caps 24 for making a U-turn at opposite ends of the main body 23, and a pair of side plates 25 for guiding the rollers 22. Thus, each roller type translation bearing can guide a rectilinear movement of the slider 12 without being restricted by a travelling distance when the rollers 22 perform infinite circulating movement while rolling within the bearing. Furthermore, since a fixing reference plane member 26 and a leaf spring 27 are attached to lateral side surfaces of each roller type linear bearing 20, 21, the bearing does not fall out of the recess 16.

A fitting plate 28 for providing an automatic centering function and spring pins 29 for fixing a wedge block 30, described later, are provided on an upper surface of the main body 23. Owing to the automatic centering action of the fitting plate 28, each of the rollers 22 is loaded with an even load.

Figure 5:
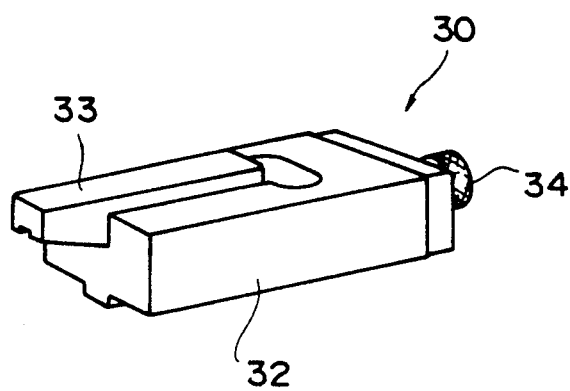
FIG. 5 is a perspective view of the preloading means shown in FIG. 1.
Figure 6:
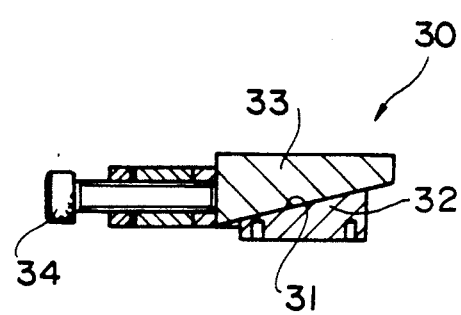
FIG. 6 is a longitudinal cross-sectional view of the preloading means of FIG. 5.
Figure 8:
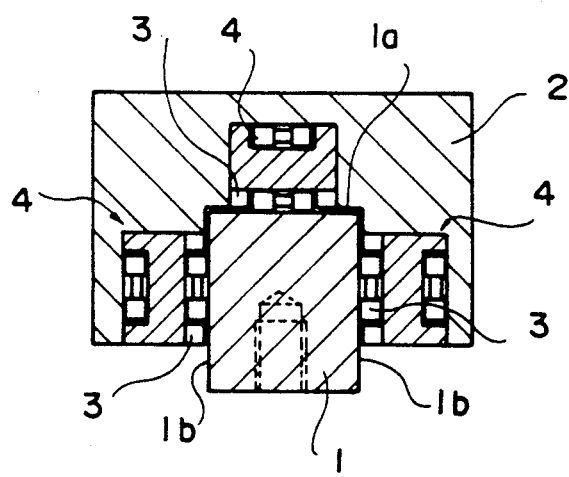
FIG. 8 is a cross sectional view of a prior art linear guide apparatus using a roller type linear bearing.

The pair of roller type linear bearings 21 having roller trains which roll on the pair of sub-tracks 14 are attached to the recess 16 sandwiching both lateral sides of the guide rail 11 and, at the time of attaching the bearing, the fitting plate 28 is attached to one side and the wedge block 30, as shown in FIGS. 5 and 6, is attached to the other side. The wedge block 30 is a preloading means for preloading the rollers 22 against the track surface. The wedge block 30 is structured so that when a preloading adjusting bolt 34 is turned, a wedge 33 slidably engaged with a main body 32 and having a slant surface 31 moves vertically. The preload which is actually applied to the roller type translation bearing 21 is estimated in advance and is set so that the preload is not nullified even under a loaded condition.

A pair of steel plates 41 extending over the whole length of the slider 12 are secured by bolts B1, FIG. 1, to bottom surfaces of both side walls of the slider 12. Inner edge portions of the steel plates 41 respectively protrude into the grooves 15 formed in both lateral sides 11b of the guide rail 11 and form protruding portions 42. On an upper surface of the protruding portion 42, there is applied with a sliding synthetic resin coating 43 having a small frictional resistance to thereby form a sliding surface 44. The sliding surface 44 slides while being in contact with an inner upper surface of the groove 15 through the sliding synthetic resin coating 43.

Furthermore, a seal member 45 formed by a rubber seal is attached to a lower surface of each of the protruding portions 42 of the steel plates 41 by a bolt B2. The seal member 45 extends over the entire length of the slider 12. A tip end of the seal member 45 is slidingly in contact with the inner surface of the groove 15.

End plates 46 having an inverted U-shape are secured to longitudinal opposite ends of the slider 12 by fixing screws (not shown) which are threaded into fixing screw holes 47. A wiper seal 48 is attached to an inner peripheral edge of the end plate 46 so that the wiper seal 48 wipes the main track surface 13 and the sub-track surfaces 14 of the guide rail 11.

Reference numeral 10 designates a fixing bolt hole bored in a bottom surface of the guide rail 11.

Next, the operation of the apparatus will be described.

In this linear guide apparatus using roller type linear bearings, the slider 12 having the roller type linear bearings 20 and 21 built therein is combined with the guide rail 11 to form a unit. Accordingly, there is no need to assemble the slider 12 and the guide rail 11 in the field and it is only necessary to merely secure the guide rail 11. Thus, the assembling accuracy is insured.

In securing the guide rail 11, it is only needed to fix the guide rail 11 by a bolt to a predetermined base by utilizing the fixing bolt hole 10. A member to be carried is fixed on the upper surface of the slider 12 by utilizing the bolt hole 12A.

When the slider 12 having the member to be carried attached thereto is moved in an axial direction, the rollers 22 of the roller type linear bearings 20 circulate infinitely while rolling on the main track surface 13. A load applied downwardly to the slider 12 is supported by the guide rail 11 through the large-type roller type translation bearing 20.

Each of the roller type linear bearings 21 is loaded in advance with a preload by the wedge block 30 so that the roller type linear bearing 21 provides high rigidity. As a result, no looseness is produced even by a load applied to the slider 12 from a lateral direction, and rolling, yawing, and the like are prevented so that motion accuracy can be maintained with high accuracy.

At the time of movement of the slider 12, the protruding portions 42 of the slider 12 slidingly move on and in contact with the inner lower surfaces of the grooves 15 of the guide rail 11 through the sliding synthetic resin coatings 43 and the protruding portions 42 function as slide guides. Also, the seal members 45 slidingly move on and in contact with the inner surfaces of the grooves 15. Sliding and contact resistances of both the protruding portions 42 and the seal members 45 provide a vibration damping effect, and the slider 12 is allowed to move smoothly and quietly, and produces low noise levels.

Furthermore, the protruding portions 42 prevent the slider 12 from slipping out of the guide rail 11. Accordingly, not only during operation but, also, at the time of removing the machine to another place, or even when an impact is applied to the machine due to a collision of the machine or an earthquake, the slider 12 never falls off of the guide rail 11. Thus, safety is insured. In addition, the guide apparatus is operable not only under a horizontally installed condition as shown in the drawings; but also under a vertically installed condition. Thus, a range of application is expanded.

The seal members 45 prevent foreign matter, such as dust and the like, from entering from the lower side of the slider 12 to which no measure has been adopted in the prior art apparatus. Thus, the dust sealing capability of the apparatus is improved.

Furthermore, the grooves 15 formed in both lateral sides of the guide rail 11 serve as dust cover guiding grooves when another dust seal device, such as a bellows or telescopic cover, is attached. Owing to the grooves 15, the fall or lift of the dust seal cover is prevented.

The seal members 45 may be formed from a synthetic resin instead of rubber.

Figure 7:
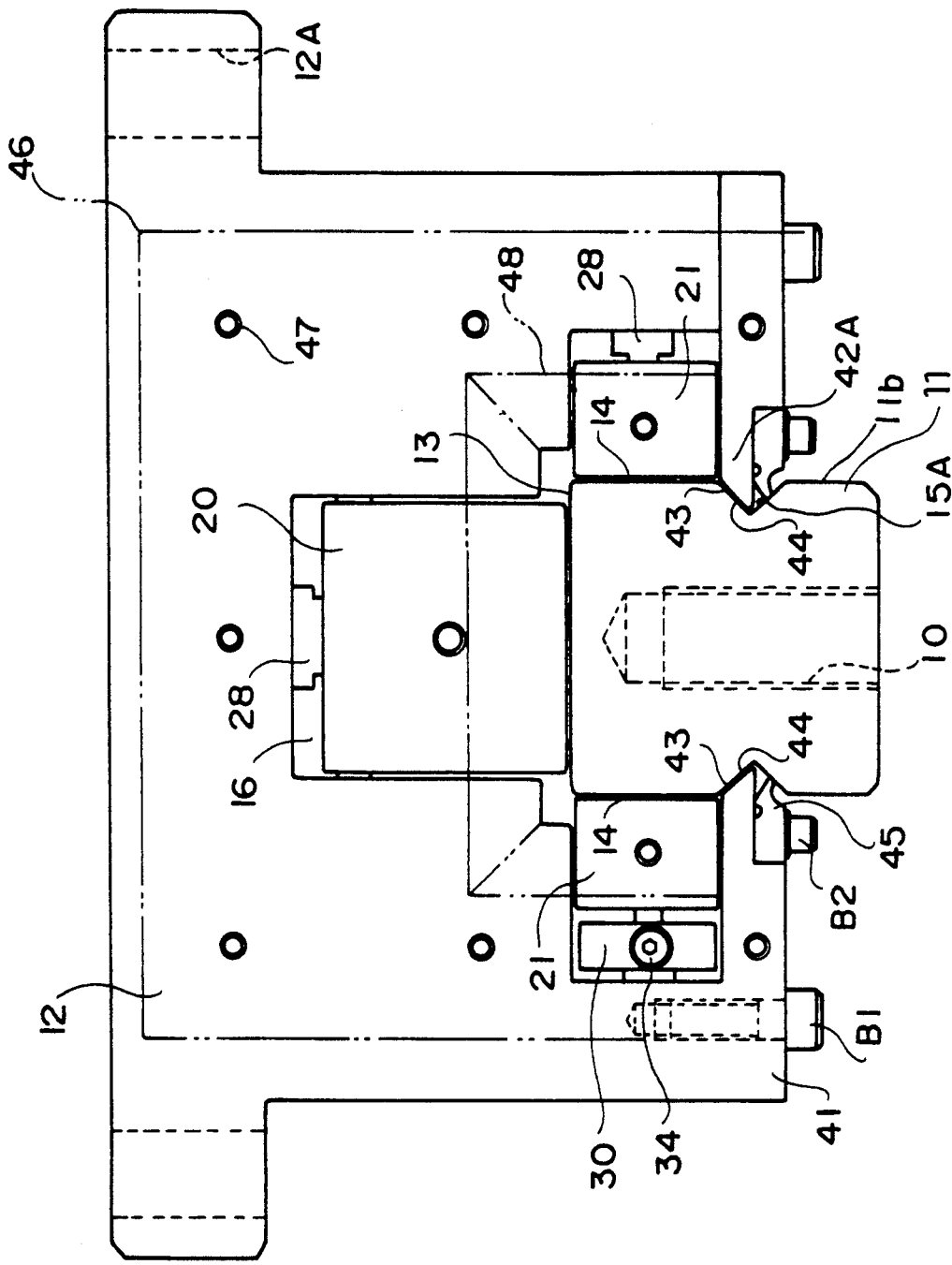
FIG. 7 is a front elevational view of a second embodiment of the invention in which an end plate is removed.

FIG. 7 shows a second embodiment of the present invention.

This embodiment differs from the first embodiment in that grooves 15A in the lateral sides of the guide rail 11 are formed in a V-shape, and the protruding portions 42A which are fitted into the grooves 15A are formed with slant surfaces.

The arrangement of the other parts and the operation is the same as described in the foregoing.

The fitting plate 28 and the wedge block 30 may be attached depending on the need of a particular application.

As described in the foregoing, in the present invention, the guide rail has on an upper surface thereof a main track surface of a roller type linear bearing for receiving a main load of the slider. The guide rail also has on both lateral side surfaces thereof respectively sub-track surfaces of roller type translation bearings for receiving lateral loads of the slider. The guide rail has grooves respectively formed in the lateral side surfaces thereof extending axially along the sub-tracks. The slider includes the roller type translation bearings having infinitely circulating roller trains, the roller type translation bearings being attached to positions respectively opposing the track surfaces of the slider. The slider further includes protruding portions formed at positions respectively opposing the sub-tracks of the guide rail. The protruding portions respectively have sliding surfaces which slide on the grooves formed in the lateral side surfaces of the guide rail. The protruding portions have seal members mounted thereon.

Owing to the arrangement mentioned above, the roller type translation guide apparatus provides an advantage in that the slider is mechanically engaged with the guide rail to prevent slipping out of the guide rail. Thus, the guide apparatus can be used in a vertically installed condition. Furthermore, a vibration damping function is provided such that the produced noise is low and the movement accuracy is high.

Moreover, when a preloading means for preloading the rollers against the track surface is provided to a roller type translation bearing which is attached to a position facing one of the sub-track surface of the guide rail, variations in the attitude of the slider are prevented and accuracy is further improved.

What is claimed is:

1. In a linear guide apparatus using roller type linear bearings comprising an axially extending guide rail and having axial track surfaces on outer surfaces thereof, a slider straddlingly mounted on said guide rail and movable in an axial direction along the track surfaces, and roller type linear bearings attached to inner surfaces of said slider facing the outer surfaces of said guide rail, said roller type linear bearings having roller trains respectively rolling on the track surfaces of said guide rail, the improvement comprising:

said guide rail has on an upper surface thereof a main track surface for one of said roller type translation bearings which receives a main load of said slider, has on both lateral side surfaces thereof respectively sub-track surfaces for two of said roller type translation bearings which receive lateral loads of said slider, and has grooves respectively formed in the lateral side surface extending axially along the sub-tracks;

said slider includes said roller type linear bearings having infinitely circulating roller trains respectively attached to positions respectively opposing the main track and the sub-track surfaces of said guide rail; and said slider further includes protruding portions formed at positions respectively opposing the sub-tracks of said guide rail, the protruding portions respectively having sliding surfaces which slide on the grooves in the lateral side surfaces of said guide rail and have seal members mounted thereon.

2. The improvement in a linear guide apparatus using roller type linear bearings according to claim 1 wherein one of said roller type linear bearings attached to a position facing one of the sub-track surfaces of said guide rail is provided with a preloading means for preloading the rollers against the sub-track surface.

3. An improvement in a linear guide apparatus using roller type linear bearings according to claim 2, wherein said preloading means is provided with a preload adjusting bolt for adjusting the amount of the preload.

* * * * *